US009729096B2

United States Patent
Edwards (10) Patent No.: US 9,729,096 B2
(45) Date of Patent: Aug. 8, 2017

(54) ELECTRICAL POWER GENERATOR FOR A GAS TURBINE ENGINE

(71) Applicant: ROLLS-ROYCE PLC, London (GB)

(72) Inventor: Huw Llewelyn Edwards, Derby (GB)

(73) Assignee: ROLLS-ROYCE plc, London (GB)

( * ) Notice: Subject to any disclaimer, the term of this patent is extended or adjusted under 35 U.S.C. 154(b) by 99 days.

(21) Appl. No.: 14/608,860

(22) Filed: Jan. 29, 2015

(65) Prior Publication Data
US 2015/0244296 A1 Aug. 27, 2015

(30) Foreign Application Priority Data
Feb. 24, 2014 (GB) .................................. 1403178.5

(51) Int. Cl.
*H02P 9/04* (2006.01)
*F02C 6/20* (2006.01)
(Continued)

(52) U.S. Cl.
CPC ................ *H02P 9/04* (2013.01); *F01D 15/10* (2013.01); *F02C 6/20* (2013.01); *F02C 9/00* (2013.01);
(Continued)

(58) Field of Classification Search
CPC .... H02P 9/04; H02P 9/007; H02P 9/48; F02C 6/20; F02C 9/00; F02C 9/28; F01D 15/10
(Continued)

(56) References Cited

U.S. PATENT DOCUMENTS

| 4,106,013 A | 8/1978 | Cronin |
| 4,541,237 A | 9/1985 | Dickey |

(Continued)

FOREIGN PATENT DOCUMENTS

| EP | 2424104 A1 | 2/2012 |
| JP | H06-339300 A | 12/1994 |
| JP | 2003-138911 A | 5/2003 |

OTHER PUBLICATIONS

Jun. 16, 2015 Search Report issued in European Patent Application No. 15 15 2873.
Sep. 18, 2014 Search Report issued in British Patent Application No. 1403178.5.

*Primary Examiner* — Viet Nguyen
(74) *Attorney, Agent, or Firm* — Oliff PLC (57) ABSTRACT

An aircraft electrical power generation system includes an AC generator having a rotor including a plurality of electromagnetic rotor-windings and stator including plurality of electrical stator-windings. The rotor mechanically coupled to a shaft of a gas turbine engine by transmission-system. The generator includes a frequency controller, a torque sensor determining a torque on the transmission-system by the generator and controller to operate the system in first and second modes. In first mode, the power output frequency of the generator controlled by the frequency controller within limits, and reduced idle signal going to a turbine engine controller. In second mode, the power output frequency of the generator not controlled by the frequency controller and increased idle signal going to the turbine engine controller. The controller operates the system in first mode when the torque is below a limit, and in second mode when the torque is above a limit.

18 Claims, 3 Drawing Sheets

(51) Int. Cl.
  *F02C 9/00* (2006.01)
  *H02P 9/00* (2006.01)
  *F01D 15/10* (2006.01)
  *F02C 9/28* (2006.01)
  *H02P 9/48* (2006.01)

(52) U.S. Cl.
  CPC .............. *F02C 9/28* (2013.01); *H02P 9/007* (2013.01); *H02P 9/48* (2013.01); *F05D 2220/323* (2013.01); *F05D 2220/764* (2013.01); *F05D 2220/7642* (2013.01); *F05D 2220/7646* (2013.01); *F05D 2270/01* (2013.01); *F05D 2270/02* (2013.01); *F05D 2270/061* (2013.01); *F05D 2270/071* (2013.01); *F05D 2270/304* (2013.01); *F05D 2270/309* (2013.01); *F05D 2270/332* (2013.01); *F05D 2270/335* (2013.01)

(58) Field of Classification Search
  USPC ........................................................ 290/40 B
  See application file for complete search history.

(56) References Cited

U.S. PATENT DOCUMENTS

| | | |
|---|---|---|
| 2001/0001534 A1 | 5/2001 | Lawson et al. |
| 2003/0180145 A1* | 9/2003 | Goldberg .................. F01D 7/00 416/1 |
| 2004/0080300 A1* | 4/2004 | Xu ........................... F02N 11/04 322/59 |
| 2005/0184698 A1* | 8/2005 | Anghel .................... H02P 6/185 318/715 |
| 2006/0087293 A1* | 4/2006 | Xu ........................... H02K 19/26 322/59 |
| 2007/0139019 A1 | 6/2007 | Wiegman et al. |
| 2008/0303280 A1* | 12/2008 | Xu ........................... H02P 9/302 290/31 |
| 2009/0243417 A1 | 10/2009 | Xu et al. |
| 2009/0286651 A1* | 11/2009 | Tanaka .................... F02N 11/04 477/167 |
| 2011/0320095 A1* | 12/2011 | Anderson ............. B60W 10/06 701/54 |
| 2013/0098042 A1* | 4/2013 | Frealle .................. F01D 21/003 60/734 |

* cited by examiner

Fig. 1

(PRIOR ART)

ELECTRICAL POWER GENERATOR FOR A GAS TURBINE ENGINE

The present invention relates to an electrical power generation system for a gas turbine engine, a method of controlling an electrical power generation system for a gas turbine engine, and a gas turbine engine comprising an electrical power generation system.

BACKGROUND

Figure 1:
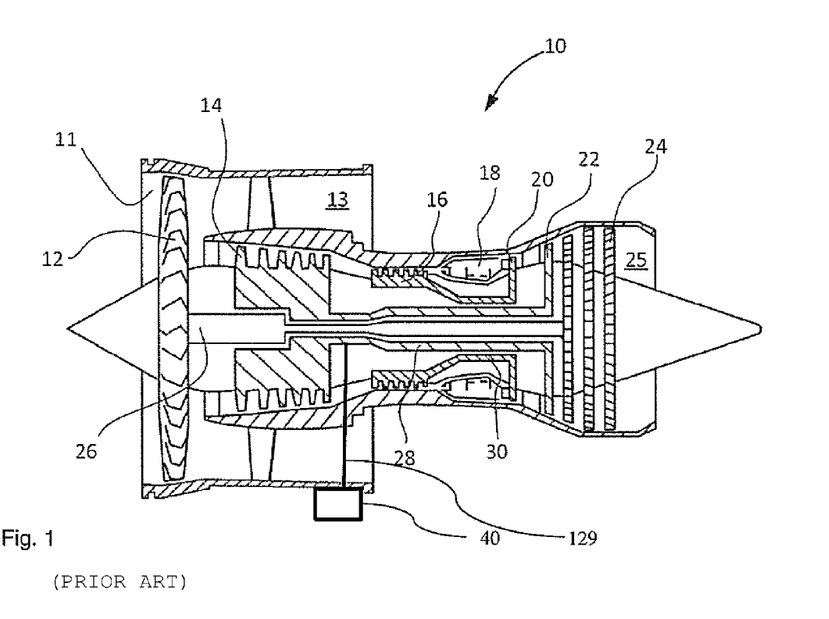
FIG. 1 is a schematic cross sectional view of a gas turbine engine.

FIG. 1 shows a prior gas turbine engine 10. The engine 10 comprises an air intake 12 and a propulsive fan 14 that generates two airflows A and B. A nacelle 30 surrounds the gas turbine engine 10 and defines, in axial flow B, a bypass duct 32.

The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. The fan 14, compressors 16 and 18, and turbines 22, 24, 26 are connected by respective shafts 34, 36, 38.

An electrical generator 40 is driven by a transmission system, which is in turn driven by one of the shafts 34, 36, 38. The electrical generator 40 provides electrical power to drive at least one of engine accessories (e.g. fuel pumps), and aircraft loads (e.g. environmental control systems (ECS) and aircraft avionics systems). In some cases, several electrical generators are provided. Two or more generators could be driven by the same shaft via a gearbox, or separate generators could each be driven by a separate one of the engine shafts 34, 36, 38.

One prior electrical generator comprises a wound field alternating current electrical generator. The generator comprises a rotor comprising a plurality of electrical windings. The rotor windings are powered by an electrical source, to induce a magnetic field in the rotor. The rotor is surrounded by a stator comprising a plurality of electrical stator windings. As the rotor rotates in use, a rotating magnetic field is produced by the rotor windings, which energises the stator electrical windings to produce an alternating current in the electrical windings of the stator.

The frequency of the electrical power produced by the machine 40 is generally proportional to the rotational speed of the rotor, which will in turn be proportional to the rotational speed of the shaft 34, 36, 38 which drives the generator 40, assuming a constant ratio gearbox is used. Constant speed gearboxes are also available, but these have a significantly higher weight and occupy a larger volume. Consequently, constant ratio gearboxes are generally used in gas turbine engines. The use of a constant ratio gearbox may however be problematic where the electrical load requires a specific frequency range in order to operate. In one example, the aircraft electrical load may be able to accommodate a frequency range of 360 to 800 Hz. This therefore limits the range of rotational speeds of the engine shaft 34, 36, 38 which drives the generator 40. In effect, the minimum rotational speed of the engine 10 must be kept above a predetermined minimum, such that the generator produces alternating current (AC) electrical power having a frequency of at least 360 Hz in this example. As a result of this minimum rotational speed dictated by the electrical requirements of the aircraft, the minimum engine thrust is higher than a thrust that might be achieved if this limitation were not present (i.e. if the minimum engine speed were dependent only on engine stability concerns), leading to increased specific fuel consumption (SFC) in some stages of flight.

One solution is to provide AC electrical power, such as three phase AC power, to the rotor windings, and to control the frequency and phase of the electrical current provided to the individual electromagnetic windings of the rotor, such that a rotating magnetic field is provided from the frame of reference of the rotor. The electrical output frequency $F_T$ of the generator is then the product of the rotational frequency $F_R$ of the magnetic field produced as a result of rotation of the rotor, and the rotational frequency $F_C$ of the rotor magnetic field produced by the AC power provided to the rotor windings:

$$F_T = F_C + F_R$$

Consequently, the frequency of the electrical power delivered from the generator output to the aircraft can be altered for a given rotor rotational speed by altering the rotational speed of the magnetic field generated by the rotor windings. The generator 40 can therefore continue to provide power at the required frequency at relatively low rotor rotational speeds, and so relatively low shaft 34, 36, 38, rotational speeds. Such an arrangement is known within the art as a "doubly fed electric machine", since electrical power is provided to both the stator and rotor windings. Such machines can be used as either generators having a variable electrical output frequency or motors having a variable rotational speed, and are widely used for example as generators in the wind turbine industry.

Alternatively, the output frequency of the generator could be corrected to the required frequency by "power electronics" (i.e. a frequency controller) electrically coupled to an output of the generator. However, power electronics capable of handling the output power of the generator are necessarily heavy, occupy a large volume, and generate a large amount of heat, and so require large cooling systems.

Whichever method is used to correct the generator output frequency, at these relatively low shaft rotational speeds, it has been surprisingly discovered by the inventor that the torque required to drive the generator 40 to produce the required electrical power (in terms of kilowatts electrical kWe) in some cases exceeds the torque capacity of the engine transmission system where the system is retrofitted to an existing system. Alternatively, in a new design, the consequently higher torque will necessarily result in a transmission system having a higher torque capacity, and therefore a higher weight than would otherwise be required. This increased torque is a consequence of the well-known relation that power is equal to torque times rotational speed. Consequently, there is a requirement for an electrical generator for an aircraft that provides sufficient electrical power for the engine and aircraft systems at the required range of frequencies, whilst simultaneously minimising the torque requirements on the drive shaft. Such systems must also comply with aviation standards such as DO-160, published by the Radio Technical Commission for Aeronautics. One such requirement is that the magnitude and frequency of the generated power does not change at a rate above a predetermined rate. Such considerations are known as "power quality".

SUMMARY OF THE INVENTION

According to a first aspect of the present invention, there is provided an electrical power generation system for an aircraft gas turbine engine, the system comprising:

a main electrical generator comprising a wound field electrical machine, the main generator having a rotor comprising a plurality of electrical rotor windings and a stator comprising a plurality of electrical stator windings, the rotor being mechanically coupled to a shaft of a gas turbine engine by a transmission arrangement, wherein the electrical power generation system comprises:

an electrical output frequency controller configured to control the frequency of an electrical output of the main generator to maintain the electrical output of the main generator within a predetermined range of frequencies;

a torque sensor arrangement configured to determine a torque imposed on the transmission system; and an engine controller configured to increase the rotational speed of the gas turbine engine in the event that the torque imposed on the transmission system exceeds a predetermined torque limit, and to reduce the rotational speed of the gas turbine engine in the event that the torque imposed on the transmission system is less than a predetermined torque limit.

Advantageously, the invention provides an electrical power generation system which allows for a reduced engine rotational speed, and so reduced fuel burn in some circumstances, particularly when the engine is operated at low engine speeds. On the other hand, the system prevents a transmission system torque limit being significantly exceeded. Consequently, the system can be installed on existing engines having transmissions with relatively low torque limits.

Alternatively, the system can be installed in new designs having transmissions with relatively low torque limits, and consequently, the weight of the transmission system can be minimised while reducing the fuel consumption of the engine.

The system may be configured to operate in a first mode, in which the frequency of the electrical power output of the electrical machine is actively controlled by the electrical output frequency controller to lie within predetermined limits and the engine controller is configured to operate the gas turbine engine at a reduced idle speed, and in a second mode, in which the frequency of the electrical power output of the electrical machine is not actively controlled by the electrical output frequency controller and the engine controller is configured to operate the gas turbine engine at or above an increased idle speed; wherein the system is configured to operate in the first mode when the torque is below the predetermined torque limit, and in the second mode when the torque is above the predetermined torque limit.

It has been found that, typically, the torque imposed on the transmission arrangement is relatively low at low shaft speeds, since many of the aircraft electrical systems draw relatively little electrical load when the aircraft is in descent or taxiing, which corresponds to times where the engine shafts are rotating at low speeds. Consequently, in the majority of instances, the electrical output frequency controller can be configured to control the output frequency, and so allow for a reduced engine idle speed, thereby resulting in reduced fuel burn. On the other hand, in instances where the aircraft shaft speed is low, but electrical demand (and so transmission torque) is high (such as in descent from high altitude or in the event of failure of an engine, where one of the electrical machines may not be available for producing electrical power), the electrical generator is controlled in the second mode, which commands a higher engine idle speed and no frequency control, and so prevents the electrical generator from overloading the shaft in terms of torque, and also ensures that the power output frequency is in the required range. Consequently, the invention allows frequency control to be used, which provides a lightweight, fuel efficient electrical generator, while preventing overloading of the shaft in extreme cases, and also ensuring that the power output frequency is in the required range under all conditions. This is particularly advantageous, since a frequency controlled AC generator in accordance with the invention can therefore be installed on existing aircraft engines, without increasing the torque capability of the transmission system. Alternatively, in new designs, the transmission arrangement can be rated for a lower torque, and can therefore be lighter. The arrangement is also robust, such that the system can operate safely in all conditions, including failure conditions such as failure of an engine or electrical generator.

According to a second aspect of the present invention, there is provided a method of controlling an electrical power generation system comprising a wound field electrical machine, the wound field electrical machine having a rotor comprising a plurality of electrical rotor windings and a stator comprising a plurality of electrical stator windings, the rotor being mechanically coupled to a shaft of a gas turbine engine by a transmission arrangement, the electrical machine having an electrical output frequency controller, the method comprising:

determining a torque imposed on the transmission system; and increasing the rotational speed of the gas turbine engine in the event that the torque imposed on the transmission system exceeds a predetermined torque limit, and reducing the rotational speed of the gas turbine engine in the event that the torque imposed on the transmission system is less than the predetermined torque limit.

The method may comprise operating the electrical power generation system in a first mode when the torque imposed on the transmission system is below the predetermined limit, and in a second mode when the torque imposed on the transmission system is above the predetermined limit, wherein in the first mode, the frequency of the electrical power output of the electrical generator is actively controlled by the electrical output frequency controller to lie within predetermined limits and the gas turbine engine is operated at a reduced idle speed, and in the second mode, the frequency of the electrical power output of the electrical generator is not actively controlled by the electrical output frequency controller and the gas turbine engine is operated at or above an increased idle speed.

When in the first operating mode, the rotational speed of the reduced idle speed may be determined such that the torque does not exceed the predetermined torque limit.

The wound field electrical machine may comprise a three phase alternating current electrical machine. The wound field electrical machine may comprise a synchronous electrical machine, in which, at a steady state, the rotational frequency of the rotor magnetic field is synchronised with the rotational frequency of the magnetic field of the stator. Alternatively, the wound field electrical machine may comprise an asynchronous electrical machine, in which, at a steady state, the rotation of the rotor magnetic field is not synchronised with the frequency of the magnetic field generated by the stator windings (i.e. there is "slip" between the rotor and stator magnetic fields).

The electrical output frequency controller may be configured to provide a multiphase alternating electric current in the electromagnetic windings of the rotor to provide a controllable rotating magnetic field in the rotor. This method of controlling electrical output frequency has been found to have a relatively small power rating compared to alternative control methodology within the expected frequency control range for aircraft electrical generator applications, and therefore relatively low weight and low cost.

The electrical output frequency controller may be also be configured to control the voltage provided to the electromagnetic windings of the rotor, such as the root mean squares (RMS) voltage. By controlling the voltage applied to the main generator rotors, the rotor magnetic field strength can be adjusted, thereby controlling the voltage produced by the main generator for a given rotor rotational speed. Consequently, the overall voltage provided by the generator can be controlled. The electrical output frequency controller may comprise a voltage sensor configured to sense an output voltage of the main generator. The electrical output frequency controller may control the rotor winding electrical current to maintain the output voltage of the main generator to within predetermined limits.

The system may comprise a further generator configured to provide AC electrical power to an input of the electrical output frequency controller. The further generator may comprise a permanent magnet AC electrical machine comprising a permanent magnet rotor, and a stator comprising at least one stator winding. The rotor of the further generator may be coupled to the transmission system.

The system may further comprise an exciter electrically coupled to an output of the electrical output frequency controller, and in input of the main generator rotor windings. The exciter may comprise a brushless wound field synchronous exciter comprising a stator having a plurality of electrical stator windings, and a rotor having a plurality of electrical rotor windings, the rotor of the exciter being configured to co-rotate with the rotor of the main generator.

Alternatively, the system may comprise a slip ring configured to transfer electrical power from the output of the electrical output frequency controller to the input of the main generator rotor electrical windings.

Advantageously, the main generator is "self powered", in that electrical power for the electrical windings of the rotor of the main generator is provided by a generator driven by the same transmission system.

Alternatively, the system may further comprise an exciter electrically coupled to an output of an AC power source and an input of the main generator rotor windings. The exciter may comprise a brushless wound field synchronous exciter comprising a stator having a plurality of electrical stator windings electrically coupled to the power source, and a rotor having a plurality of electrical rotor windings. In this embodiment, an input of the electrical output frequency controller may be configured to co-rotate with the rotor of the main generator, and may be electrically coupled to an output of the exciter rotor windings, and an output of the electrical output frequency controller may be electrically coupled to an input of the rotor windings of the main generator. The AC power source coupled to the input of the exciter stator windings may comprise a high frequency inverter configured to provide high frequency AC electrical power Since the frequency correction required for the main generator may be relatively small, the AC electrical current provided to the main generator electrical rotor windings may consequently have a relatively low frequency (of the order of perhaps a 10-100 Hertz. Depending on the pole number ratios between the exciter and main generator rotor, the exciter frequency will typically be multiples of the main generator rotor frequency. In general, transformers such as the exciter having a low output frequency generally have a higher weight than those having a high output frequency. Consequently, where the frequency applied to the exciter is high, a relatively small exciter can be provided, thereby reducing the weight of the system. This high frequency AC power is then converted to the required low frequency AC power by the frequency controller, which co-rotates with the rotor of the main generator.

Alternatively, the electrical output frequency controller could comprise an AC/AC converter, such as a "power electronics" unit or a cycloconverter unit, configured to convert AC current produced in the stator windings of the electrical machine having an input frequency, to an output frequency having a different frequency than the input frequency.

The generator torque sensor arrangement could determine the torque imposed on the main generator by a direct measurement of transmission arrangement mechanical torque, or by a proxy measurement. For example, the generator mechanical torque sensor arrangement may comprise a torque sensor configured to sense the torque load on part of the transmission arrangement such as the generator drive shaft, or another part of the transmission arrangement, or may comprise a generator electrical power demand sensor configured to sense electrical load on the generator. The generator electrical power demand sensor may comprise one or more current transducers, and may comprise one or more voltage transducers. These could be the same sensors used for other purposes, such as a voltage regulation system. A current transducer may be provided for each electrical phase of the electrical output of the generator. Where the generator torque sensor arrangement comprises a generator electrical power demand sensor, the generator torque sensor arrangement may further comprise a generator efficiency sensor configured to sense the electrical efficiency of the generator (i.e. the resistive losses in the stator of the generator), and may further comprise a generator power factor sensor configured to sense a phase difference between the electrical phases of the generator. The generator efficiency sensor may comprise one or more of a stator or rotor temperature sensor, and a rotor speed sensor. Advantageously, the torque applied to the transmission system can be accurately deter mined either directly, or indirectly, in some cases using existing equipment installed on the aircraft.

The engine controller may be configured to reduce or increase the rotational speed of the engine at a rate less than a predetermined rate. Advantageously, the rotational speed of the electrical generator will rise or fall at a rate below a predetermined rate, and so power quality can be maintained when switching between the first and second operating modes.

The electrical generator may be configured to switch between the first and second operating modes gradually, such that the output frequency of the generator does not change at a rate greater than a predetermined rate when the generator switches between the first and second operating modes. Again, the invention ensures that power quality is maintained, by enabling and disabling electrical output frequency control gradually, thereby ensuring that output power frequency does not change at a rate greater than a predetermined rate under any circumstances, thereby complying with required power quality standards.

The gas turbine engine may comprise a three shaft gas turbine engine comprising high, intermediate and low pressure main shafts, and the generator may be driven by the intermediate pressure main shaft. The gas turbine engine may comprise further electrical generators, which may be driven by further shafts.

The transmission arrangement may comprise a mechanical coupling, and may comprise a gearbox.

The transmission arrangement may comprise a torque protection arrangement configured to decouple the generator from the gearbox when a predetermined torque is applied. The torque protection arrangement may comprise a frangible connection configured to break when the predetermined torque is applied. Alternatively or in addition, the torque protection arrangement may comprise a clutch arrangement configured to disengage the generator from the gearbox when the predetermined torque is applied. Advantageously, on failure of the generator control arrangement or frequency control system, the torque protection arrangement can prevent the gearbox from being damaged, which might otherwise result in failure of the gas turbine engine.

The torque protection system may comprise a load shedding arrangement configured to selectively disconnect electrical loads from the electrical network in the event that the predetermined torque is exceeded.

BRIEF DESCRIPTION OF DRAWINGS

For a better understanding of the present invention, and to show more clearly how it may be carried into effect, reference will now be made, by way of example to the following drawings, in which:

FIG. 3 is a schematic drawing of part of the electrical generator of FIG. 2.

DETAILED DESCRIPTION OF EMBODIMENTS

Figure 2:
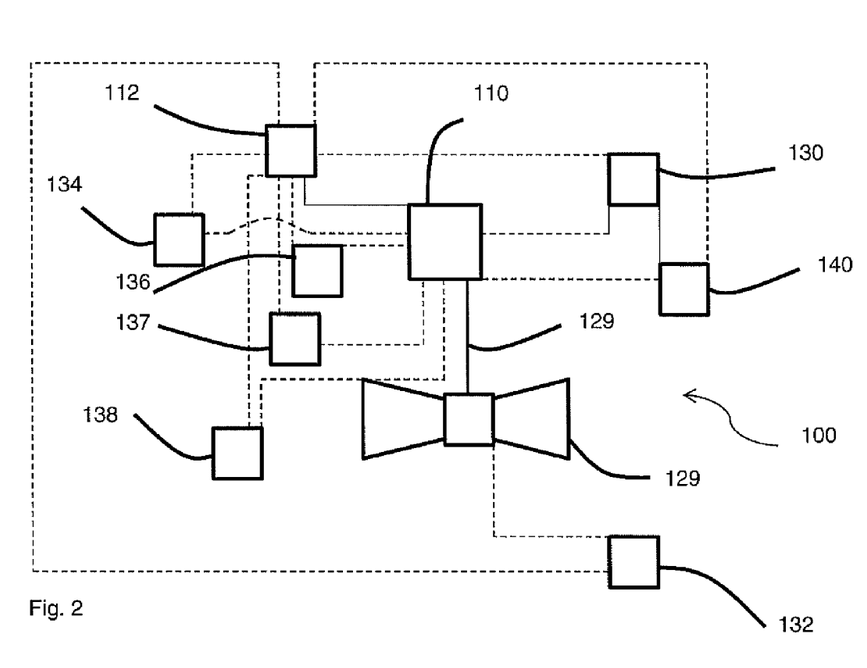
FIG. 2 is a schematic drawing showing electrical and mechanical connections of an electrical generator system in accordance with the present invention.

FIG. 2 shows an electrical generator system 100 comprising a main electrical generator 110, generator controller 112, and torque sensor arrangement. The electrical generator system 100 is coupled to an intermediate pressure shaft 36 of a three shaft gas turbine engine 10, shown in detail in FIG. 1. Rotation of the shaft 36 rotates the generator 110 via a transmission arrangement in the form of a power offtake shaft 129, and so produces electrical power. The transmission arrangement could comprise a gearbox such as a reduction gearbox and bevel gears (not shown).

Figure 3:
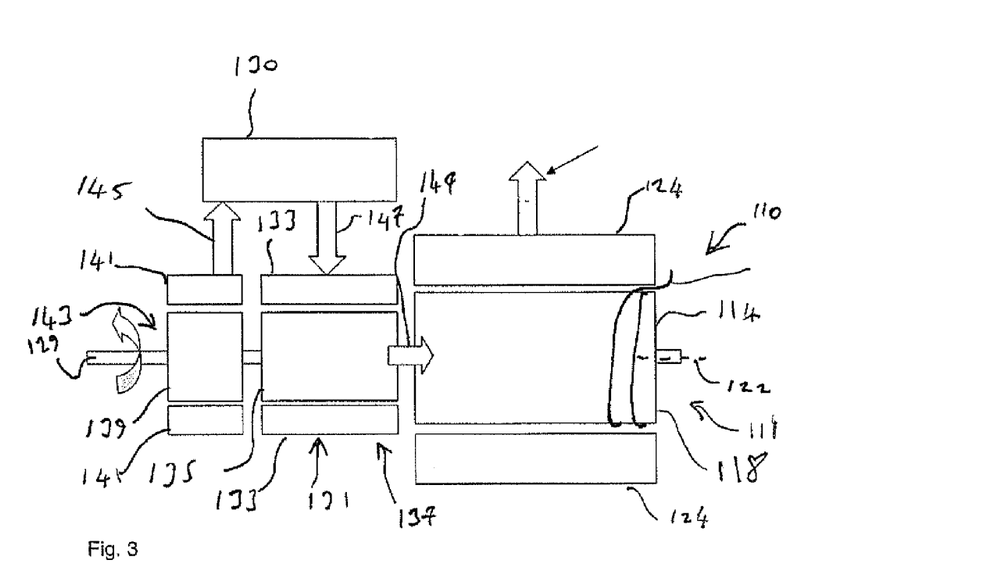
FIG. 3 is a block diagram showing part of the electrical generator of FIG. 2.

FIG. 3 shows the main generator 110 in more detail. The main generator 110 is in the form of a doubly fed synchronous wound field electrical machine 111. The electrical machine 111 comprises a rotor 114 comprising a plurality of rotor pole pairs. Each pole pair comprises an electromagnetic winding 116 wound around a ferromagnetic core 118. The pole pairs are coupled to and arranged radially around a central axis 122 defined by the power offtake shaft 129, which is in turn coupled to the intermediate pressure shaft 36 of the gas turbine engine 10. The generator further comprises a stator 124 comprising a plurality of electrical stator windings. The stator windings are wound around a ferromagnetic stator core, and are connected for three-phase operation.

Three phase AC electrical power is provided to the rotor windings by a main rotor winding power supply arrangement. The main rotor power supply arrangement comprises a rotor frequency and voltage controller 130, a brushless wound field synchronous exciter 137 comprising a rotor 139 and stator 141 and a further AC generator in the form of a permanent magnet electrical machine 143 comprising a rotor 135 and stator 133. The rotor 135 of the permanent magnet electrical machine 143 comprises at least one permanent magnet, and the stator 133 of the permanent magnet electrical machine 143 comprises at least one stator winding. The rotors 135 and 139 of the permanent magnet electrical machine 141 and exciter 137 are coupled to the shaft 129, such that rotation of the shaft 129 causes rotation of the rotors 135, 139, 114.

Rotation of the rotor 139 of the permanent magnet electrical machine 139 induces an AC electrical current in the stator windings due to the rotating magnetic field provided by the rotor 139. This AC electrical current is provided to an input of the frequency controller 130 by an electrical connection 145. An output of the rotor frequency controller 130 is in turn electrically connected to the windings of the rotor 114 of the main generator 110 via the brushless exciter 131 through an electrical connection 147. The rotor frequency controller 130 is in the form of a voltage and frequency controller configured to provide three phase AC electrical current having a required frequency to the rotor windings 114 from the input AC electrical power, to induce a magnetic field in the windings 116. The frequency controller 130 controls the output voltage of the main generator 110 by adjusting the main rotor 114 electrical windings to thereby adjust the main rotor magnetic field, and therefore the main generator output voltage. A voltage sensor (not shown) could be provided to measure the output voltage of the main generator 110. The rotor frequency controller 130 could then adjust the electrical current through the main rotor windings to maintain the main generator 110 output voltage to within predetermined limits via a feedback control loop.

The brushless exciter 131 comprises a one or more stators 133 and a rotor 135. AC electrical current in the stator windings 133 provided by the frequency and voltage controller 130 induces an AC electrical current in the rotor windings of the rotating rotor 135 of the exciter. The AC electrical current from the rotor winding of the rotor 135 of the exciter 137 is then provided to the rotor windings of the main generator rotor 114 via a connection 149. Essentially therefore, the permanent magnet electrical machine 143 provides power for the frequency controller 130, which is then transmitted to the rotor 114 of the main generator 110 via the exciter 137.

The power supply arrangement is configured to provide a controllable rotating magnetic field in the rotor 114, which rotates about the rotor axis 122. This is achieved by energising the windings with AC electrical power, and, using the frequency controller 130, controlling the frequency and phase of the AC current to produce the rotating magnetic field within the rotor 114. By controlling the direction and rotational speed of the rotating magnetic field, the output frequency of the generator 110 can be adjusted, in accordance with the following equation:

$$F_T = F_C + F_R$$

Where $F_T$ is the output frequency of the generator 110, $F_R$ is the frequency of the rotor as viewed by the reference frame of the stator 124 when no frequency correction is in use, and $F_C$ is the frequency of the rotor magnetic field induced by the electrical currents provided to the rotor windings as viewed in the rotor 114 reference frame. Where the magnetic field induced by the AC current in the rotor 114 rotates in either the opposite or same direction to the rotor 114 itself, the output frequency will be in accordance with the following equation:

$$F_T = F_C + F_R$$

In general, in the present invention, the magnetic field induced by the AC current in the rotor 114 rotates in the same direction as the rotor 114 itself, since it is an aim of this invention to increase the frequency of the AC electrical current produced by the main generator 110 to account for relatively low speed rotation of the shaft 129 at low engine speeds.

The torque sensor arrangement is configured to determine a mechanical torque imposed on the transmission system. Mechanical torque is imposed on the transmission system by the main generator 110 as well as the exciter 137, permanent magnet generator 141, as well as components of the transmission system itself. However, it has been found that by far the largest torque load on the transmission system comes from the main generator 110.

In the described embodiment, the torque sensor arrangement senses the mechanical torque imposed on the transmission system 129 indirectly, by taking proxy measurements. However, the system could alternatively comprise a torque sensor configured to directly sense the torque imposed on the transmission system by the generator.

FIG. 2 shows an electrical schematic of the system 100 as a whole, including the torque sensor arrangement. The torque sensor arrangement comprises an electrical power demand sensor comprising a current transducer 134 for each of the three electrical phases of the generator 110, and a voltage transducer 136. A suitable current transducer could comprise a series 1004 provided by American Aerospace Controls, and a suitable voltage transducer could comprise a series 102M3 provided by American Aerospace Controls. Together, the current and voltage transducers determine the power demand imposed on the generator 110. The torque sensor arrangement also includes a generator efficiency sensor configured to sense the electrical efficiency of the generator 110, and a generator power factor sensor 137 configured to sense a phase difference between the electrical phases of the generator 110. The generator efficiency sensor comprises a stator temperature sensor 138, and a rotor speed sensor 140. The generator controller 112 includes algorithms or lookup tables relating limits of stator or rotor temperatures and rotor speeds, and corresponding generator efficiency, as determined through tests. Alternatively, the generator efficiency could be calculated or determined from other measurements from different sensors. Each of the current and voltage transducers 134, 136, stator temperature sensor 138, rotor speed sensor 140 and power factor sensor 137 are electrically coupled to the generator controller 112, which uses signals from the sensors 134, 136, 137, 138, 140 to determine the torque imposed on the transmission system by the generator 110 using, for example, a series of lookup tables. Two or more of each of the sensors 134, 136, 137, 138, 140 may be provided to provide redundancy. This ensures that failure of a sensor does not jeopardise the safety of the aircraft.

The generator controller 112 is also connected to an engine control unit (ECU) 132. The ECU 132 controls the engine 10 rotational speed, by adjusting fuel flow and other parameters to the engine 10. The ECU 132 is therefore configured to control the engine 10 idle speed, and other engine speeds.

The transmission system 129 has a maximum rated torque. If a torque greater than the rated torque is applied to the transmission, the transmission system could fail catastrophically. Alternatively, a torque higher than the rated torque could reduce the service life of the transmission system.

In general, the torque T applied by the main generator 110 is equal to the power load P imposed by the generator 110 divided by the rotational speed W of the shaft 36:

$$P = T \times W$$

To avoid applying an excessive amount of torque to the transmission system, the frequency controller 130 is operable in a first operating mode, in which the frequency of the electrical power output of the electrical generator 110 is controlled by the electrical output frequency controller 130 to lie within predetermined limits and the ECU 132 operates the engine 10 at or above a reduced engine idle speed, and in a second mode, in which the frequency of the electrical power output of the electrical generator 110 is allowed to vary in dependence on shaft offtake 36 rotational speed, the ECU 132 operates the engine 10 at or above an increased engine idle speed. The operating mode is selected by the generator controller 112 such that the generator 110 is operated in the first mode when the torque sensed by the torque sensor arrangement is below a predetermined limit, and in the second mode when the torque sensed by the torque sensor arrangement is above the predetermined limit.

Therefore, when the torque is sensed to be below the predetermined limit, the engine 10 can be operated at a lower rotational speed (i.e. a reduced idle speed), while providing sufficient power to the engine and aircraft electrical systems at the required frequency and avoiding excessive amounts of torque on the transmission system 129. Consequently, the engine can be operated at lower power levels (i.e. a lower idle) when the aircraft is in descent, or taxiing on the ground. Conveniently, the parts of the flight cycle requiring low thrust generally coincide with the parts of the flight cycle requiring relatively small aircraft and engine electrical loads. This is because descent and taxi occur at relatively low altitudes, minimising the electrical requirement for aircraft environmental control systems (in particular, pressurisation), and the lower fuel flow at low engine thrust also dictates lower loads on engine electrical fuel pumps. These phases of flight contribute to a significant portion of the flight cycle, particularly for aircraft which are used on a high number of relatively short flight cycles, and so it is thought that overall flight cycle fuel savings of 0.25 to 0.5% can typically be achieved using the present invention. Essentially therefore, the engine controller is configured to control the rotational speed of the gas turbine engine in accordance with the measured torque imposed on the transmission system to maintain the torque imposed on the transmission system below a predetermined torque limit.

On the other hand, it is a requirement that the torque applied to the transmission system by the generator 110 does not exceed the maximum torque capability of the transmission 129 in any event. For example, unexpectedly high electrical loads may be required during descent. Descent from very high altitudes may also require high electrical loads. Furthermore, if one of the generators 110 on one of the engines 10 in an aircraft having two or more engines fails, then all of the electrical demand must be provided by a single generator 110. The other generator 110 may be required to operate as an electrical motor to restart the failed engine 10. This would impose high electrical demands on the single remaining generator 110, and therefore high torques on the transmission system 129.

The generator controller 112 is therefore configured to operate the generator 110 in the second mode (i.e. without controlling the output frequency of the generator 110 when the torque sensed by the torque sensor arrangement is allowed to vary in dependence on shaft rotational speed) when the torque is sensed to be above the predetermined limit, and to operate the engine at an increased idle speed. The predetermined level will be dependent on the specifics of the engine 10. In general through, the predetermined limit will be slightly less than the maximum torque capability of the transmission system.

However, where the generator 110 is operated in the second mode, the frequency output of the generator 110 may then fall outside the acceptable range where the rotational speed of the engine 10 is below a certain limit, which may be the case where the aircraft is operated at a reduced idle speed. Consequently, the engine must be operated at an increased rotational speed. This increased rotational speed is commanded by the ECU 132.

The system may further include a torque protection arrangement configured to decouple the generator from the transmission arrangement when an excessively high torque (i.e. one significantly greater than the predetermined torque) is applied to the transmission system. Such an excessively high torque could be provided if for example, a mechanical failure were to occur which might prevent the main generator 110 from turning freely.

In one example, a frangible connection could be provided in the transmission arrangement between the shaft 129 and the main generator 110, such that the transmission arrangement would be mechanically decoupled from the main generator 110 in the event of a mechanical failure, or other over-torqueing event.

In a second example, a clutch arrangement (not shown) could be provided between the main generator 110 and shaft 36, which could be selectively actuated to decouple the main generator and transmission arrangement in the event of an excessively high torque.

Figure 4:
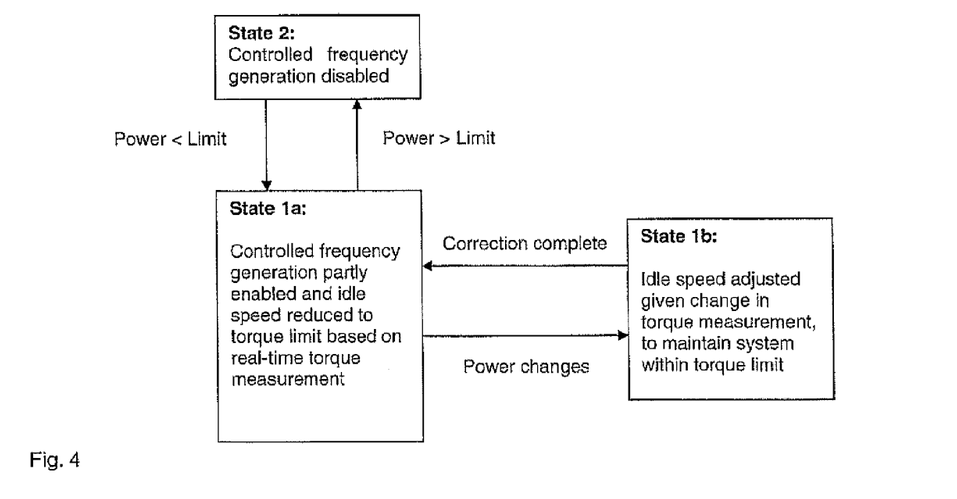
FIG. 4 is a flow diagram illustrating a method of operation of the electrical generator system of FIG. 2.

FIG. 4 shows one possible method of operating the generator 110 in accordance with the invention.

Starting from state 2 (i.e. the second operating mode), in which frequency control by the frequency controller 130 is disabled, the torque, as determined by the generator controller 112 in accordance with signals from the sensors 134, 136, 137, 138, 140, is continuously monitored. If the determined torque is greater than the limit, the generator 110 continues to operate in the second operating mode. In this operating mode, a signal is sent from the generator controller 112 to the ECU 132 to maintain the engine 10 at or above a higher idle speed. The ECU 132 may in turn provide a signal to a flight management computer (not shown) indicating that the higher idle speed is in operation. The higher idle speed is determined by the minimum electrical frequency which can be accepted by the aircraft electrical system, and the corresponding rotational speed of the shaft 36 which drives the generator 110, when frequency control is not provided.

If however the torque is determined to be less than the predetermined limit, the generator controller 130 sends a signal to the frequency controller 112 to operate in the first operating mode (state 1a shown in FIG. 4), in which frequency control of the frequency controller 130 is enabled, such that the frequency of the electrical output of the generator 110 is controlled to lie within predetermined limits, as determined by the electrical frequency requirements of the aircraft electrical system (e.g. greater than 360 Hz).

In this first operating mode, the generator controller 130 continues to calculate the torque placed on the transmission system, and sends a signal to the ECU 132 allowing a reduced idle speed (assuming other conditions allow it, for example icing) until the torque limit is reached, as determined by the sensors 134, 136, 137, 138, 140. The frequency controller 130 modifies the frequency and phase of the electrical power delivered to the rotor windings 118 as the engine rotational speed reduces, to maintain the electrical power output frequency within the required range. Again, a signal may be provided to the flight management computer that the lower idle speed has been selected. There could also be the option for the pilot to reject a change to this setting.

As the power output from the generator 110 changes during operation, so does the torque on the engine 10. When a change in power output is detected by the sensors 134, 136, 137, 138, 140, the idle speed is again changed to maintain the torque within the required limits, as shown in FIG. 4 as state 1b. If the torque then increases beyond the predetermined level, the generator returns to state 2, where the frequency control is disabled, and the engine 10 is operated at the higher idle speed.

The ECU 132 is configured to change the idle speed at a rate below a predetermined rate. This ensures that the frequency of the electrical power output does not change more quickly than a predetermined rate, thereby ensuring that the system complies with power quality restrictions, such as those implemented in DO160.

Figure 5:
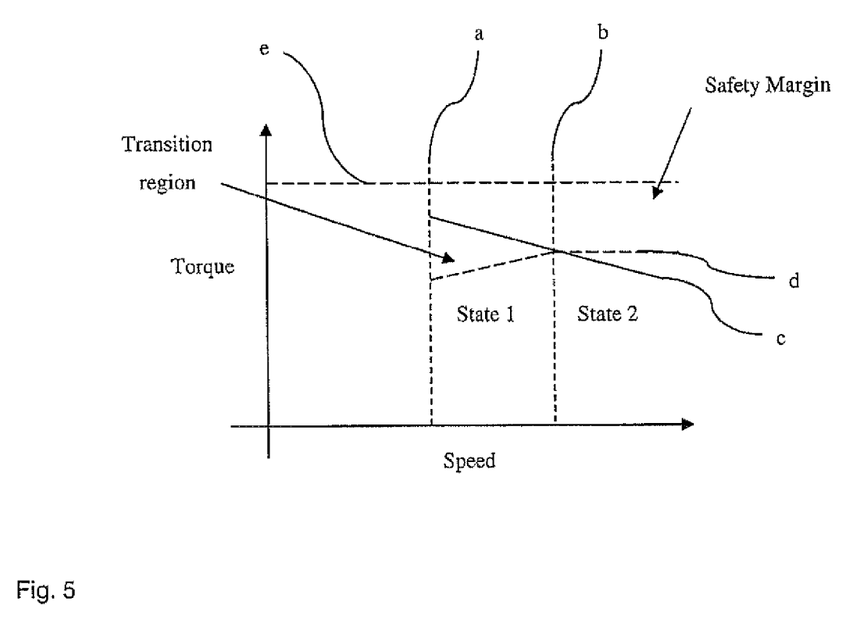
FIG. 5 is a graph showing rotational engine speed and corresponding torque imposed on the transmission system, showing different operating regions.

FIG. 5 illustrates the relationship between engine speed and torque imposed on the transmission arrangement, and corresponding operating modes when operated in accordance with the present invention.

The horizontal axis represents the rotational speed of the engine. In this example, two speeds are represented by constant speed lines "a" and "b", which correspond to a reduced engine idle speed and an increased engine idle speed respectively. In general, at engine rotational speeds significantly above idle, the engine will be operated in state 2 (i.e. without frequency correction). However, it is envisaged that in some cases, frequency correction could be provided at higher engine speeds.

The vertical axis represents torque imposed on the transmission system by the main generator 110. The magnitude of this torque is dependent on both the electrical load on the generator 110 as a result of aircraft electrical demand, and on the rotational speed of the generator (and so on engine rotational speed). A constant maximum power line is shown as line "c". This is the torque imposed on the transmission system by the generator 110 at a peak electrical load (i.e. the highest electrical load which the generator 110 is capable of supporting), for different engine rotational speeds. As can be seen, at constant power, torque imposed on the transmission system by the generator 110 falls in direct proportion to engine rotational speed.

Line "d" represents the predetermined torque limit. As can be seen, the predetermined torque limit is constant when the system is operated in state 2, and varies in dependence on speed when the system is operated in state 1. This variation is optional—the torque limit could remain constant. It may be beneficial to have a variable limit that reduces with gas turbine engine shaft rotational speed to give more safety margin as the gas turbine engine shaft rotational speed is reduced. This is advantageous as the maximum rate of change of gas turbine engine shaft rotational speed is low relative to the rate of change of electrical power demand possible on an electrical network, particularly where the engine 10 is operated at a low speed. This extra safety margin simply allows the gas turbine engine 10 more time to accelerate, thereby reducing the torque imposed on the transmission system, where the gas turbine engine 10 is operated at a relatively low speed.

As the torque imposed on the transmission arrangement varies in use in accordance with varying electrical demand, the torque imposed on the transmission arrangement is monitored by the sensors 134, 136, 137, 138, 140.

When in state 1, the engine speed is adjusted such that measured torque remains below the torque limit line. In some cases, the measured torque may be permitted to exceed the predetermined limit for a short period of time, before being brought back down to below the predetermined limit by increasing the engine rotational speed. Simultaneously, the AC electrical output frequency is altered by the frequency controller 130 to remain within the predetermined limits.

When in state 2, the engine speed is sufficiently high to maintain measured torque below the torque limit line. However, since the corresponding main generator rotor speed produces electrical power having a frequency within the predetermined limits at this engine speed, frequency correction is no longer required, and consequently, the frequency controller 130 does not actively alter the electrical output frequency of the electrical generator 110.

Should the torque imposed on the transmission system exceed the shear torque limit (as shown by constant torque line "e"), the torque protection system will be activated, which will decouple the main generator 110 from the transmission system, thereby preventing damage to the transmission system. This would be set up to be a very rare condition. Other protection system could be employed before this, such as load shedding or generator electrical disconnection.

The difference between the shear torque "e" and the predetermined torque line "d" represents a safety margin, such that the system can allow the torque to temporarily slightly exceed the predetermined torque, without activating the torque protection system, which might result in permanent damage to the system, or a generator 110 shutdown. This is particularly advantageous, since known gas turbine engines generally take a relatively long amount of time to accelerate in comparison to the period of time over which electrical load transients occur. It will be noted that the maximum torque which may be applied by the main generator 110 in normal operation (i.e. the point where the constant power line and the reduced idle speed intersect) is below the shear torque limit, such that the shear torque limit will not be exceeded under normal operation, irrespective of the acceleration response of the engine 10.

The area bounded by the constant power line and the predetermined torque limit within state 1 represents a "transition region". Since sudden increases in shaft rotational speed, and sudden removal of frequency correction may not be possible or desirable (in view of component limitations and power quality considerations), changing operation from state 1 to state 2 (i.e. ceasing frequency correction) may be done gradually.

It will be appreciated that the present invention thus provides a system and method of operation which allows for a reduced idle speed of an aircraft engine, thus reducing fuel consumption during descent and taxi, while ensuring that restrictions relating to mechanical torque limits, electrical power levels and electrical power frequencies are adhered to at all times.

Various changes could be made without departing from the scope of the invention. For example, a different form of frequency control could be used. For example frequency control could be provided by an AC/AC converter, such as a "power electronics" unit or a "cycloconverter" unit, configured to convert AC current produced in the stator windings of the electrical machine having an input frequency, to an output frequency having a different frequency from the input frequency. This could be provided in addition to or in place of the frequency and voltage controller unit. The electrical generator could comprise a different type of AC electrical generator than that described, or could comprise more or fewer electrical phases. For example, the electrical generator could comprise an asynchronous doubly fed wound field electrical generator. The generator could be coupled to a different shaft of the gas turbine engine, and the gas turbine engine could be of a different form. For example, the gas turbine engine could have more or fewer shafts, and could comprise a turboprop or a turboshaft for example. The predetermined torque limit could be a fixed limit, or could be determined in accordance with remaining engine life for example. The system could comprise a single controller for controlling both the engine rotational speed and the electrical generator, which could be the ECU or FADEC.

The system could further comprise energy storage, to help with the transition period between operation in state 1 and state 2. The energy storage would be sized to handle the peak electrical transient, giving the system time to move from state 1 to state 2 whilst maintaining power quality. With energy storage the system could be optimised to operate in state 1 for higher power settings/torques, i.e. with a reduced safety margin. This could increase the utilisation of the system and increase fuel savings. The energy storage could be on the engine or on the aircraft near DC electrical loads. It could send AC or DC power, depending on the aircraft network configuration, and could be made up of one or a combination of batteries, supercapacitors, power electronics (for DC to AC conversion) or fly wheels.

The rotor frequency and voltage controller could alternatively be mounted on the exciter rotor such that the rotor frequency and voltage controller co-rotates with the rotor of the main generator. In this case, the rotor frequency and voltage controller could be electrically coupled to the exciter and the main generator rotor such that an input of the frequency controller is electrically coupled to the exciter rotor windings, and an output of an output of the frequency controller is electrically coupled to the main generator rotor windings. In this embodiment, a high frequency AC electrical source would be provided to the stator windings of the exciter, which could for example be provided by a power electronics unit. Since the frequency correction required for the main generator is in most cases relatively small, the AC electrical current provided to the main generator electrical rotor windings will consequently have a relatively low frequency of the order of perhaps a few tens of hertz. In general, transformers such as the exciter having a low output frequency generally have a higher weight than those having a high output frequency. Consequently, where the frequency applied to the exciter is high, a relatively small exciter can be provided, thereby reducing the weight of the system. This high frequency AC power is then converted to the required low frequency AC power by the frequency controller.

The invention claimed is:

1. An electrical power generation system for an aircraft gas turbine engine, the system comprising:
   a main electrical generator comprising a wound field electrical machine, the main generator having a rotor comprising a plurality of electrical rotor windings and a stator comprising a plurality of electrical stator windings, the rotor being mechanically coupled to a shaft of a gas turbine engine by a transmission arrangement, wherein the electrical power generation system comprises:
   an electrical output frequency controller configured to control the frequency of an electrical output of the main electrical generator within a predetermined range of frequencies;
   a torque sensor arrangement configured to determine a torque imposed on the transmission arrangement; and
   an engine controller configured to increase the rotational speed of the gas turbine engine in the event that the torque imposed on the transmission arrangement exceeds a predetermined torque limit, and to reduce the rotational speed of the gas turbine engine in the event that the torque imposed on the transmission arrangement is less than the predetermined torque limit,
   wherein the system is configured to operate in a first mode, in which the frequency of the electrical power output of the electrical machine is actively controlled by the electrical output frequency controller to lie within predetermined limits and the engine controller is configured to operate the gas turbine engine at a reduced idle speed, and in a second mode, in which the frequency of the electrical power output of the electrical machine is not actively controlled by the electrical output frequency controller and the engine controller is configured to operate the gas turbine engine at or above an increased idle speed; wherein the system is configured to operate in the first mode when the torque is below the predetermined torque limit, and in the second mode when the torque is above the predetermined torque limit.

2. A system according to claim 1, wherein the wound field electrical machine comprises a three phase alternating current electrical generator.

3. A system according to claim 1, wherein the wound field electrical machine comprises a synchronous electrical machine.

4. A system according to claim 1, wherein the electrical output frequency controller is configured to provide a multiphase alternating electric current in the electromagnetic windings of the rotor to provide a controllable rotating magnetic field in the rotor.

5. A system according to claim 4, wherein the system comprises a further generator configured to provide AC electrical power to an input of the electrical output frequency controller.

6. A system according to claim 4, wherein the system comprises an exciter electrically coupled to an output of the electrical output frequency controller, and an input of the main generator rotor windings.

7. A system according to claim 6, wherein the exciter comprises a brushless wound field synchronous exciter comprising a stator having a plurality of electrical stator windings, and a rotor having a plurality of electrical rotor windings.

8. A system according to claim 4, wherein the system further comprise an exciter electrically coupled to an output of an AC power source and an input of the main generator rotor windings, wherein the electrical output frequency controller co-rotates with the main generator rotor, and an input of the electrical output frequency controller is electrically coupled to an output of the exciter rotor windings, and an output of the electrical output frequency controller is electrically coupled to an input of the rotor windings of the main generator.

9. A system according to claim 1, wherein the generator torque sensor arrangement comprises a torque sensor configured to sense the torque load on the transmission arrangement.

10. A system according to claim 1, wherein the generator torque sensor arrangement comprises a generator electrical power demand sensor configured to sense electrical load on the generator.

11. A system according to claim 10, wherein the generator electrical power demand sensor comprises one or more of a current transducer and a voltage transducer.

12. A system according to claim 11, wherein a current transducer is provided for each electrical phase of the electrical output of the generator.

13. A system according to claim 11, wherein the generator torque sensor arrangement comprises one or more of a generator electrical power demand sensor, a generator efficiency sensor configured to sense the electrical efficiency of the generator, and a generator power factor sensor configured to sense a phase difference between the electrical phases of the generator.

14. A system according to claim 13, wherein the generator efficiency sensor comprises one or more of a stator or rotor temperature sensor, a rotor speed sensor and current measurements.

15. A system according to claim 1, wherein the engine controller is configured to reduce or increase the rotational speed of the engine at a rate less than a predetermined rate.

16. A system according to claim 1, wherein the generator is configured to switch between the first and second operating modes gradually, such that the output frequency of the generator does not change at a rate greater than a predetermined rate when the generator switches between the first and second operating modes.

17. A method of controlling an electrical power generation system comprising a wound field electrical machine, the wound field electrical machine having a rotor comprising a plurality of electrical rotor windings and a stator comprising a plurality of electrical stator windings, the rotor being mechanically coupled to a shaft of a gas turbine engine by a transmission arrangement, the electrical generator having an electrical output frequency controller, the method comprising:
   determining a torque imposed on the transmission arrangement by the generator; and increasing the rotational speed of the gas turbine engine in the event that the torque imposed on the transmission arrangement exceeds a predetermined torque limit, and reducing the rotational speed of the gas turbine engine in the event that the torque imposed on the transmission arrangement is less than the predetermined torque limit, and
   operating the electrical power generation system in a first mode when the torque imposed on the transmission arrangement is below the predetermined limit, and in a second mode when the torque imposed on the transmission arrangement is above the predetermined limit, wherein in the first mode, the frequency of the electrical power output of the electrical generator is actively controlled by the electrical output frequency controller to lie within predetermined limits and the gas turbine engine is operated at a reduced idle speed, and in the second mode, the frequency of the electrical power output of the electrical generator is not actively controlled by the electrical output frequency controller and the gas turbine engine is operated at or above an increased idle speed.

18. A method according to claim 17, wherein, when in the first operating mode, the rotational speed of the reduced idle speed is determined such that the torque does not exceed the predetermined torque limit.

* * * * *